US008045568B2

(12) United States Patent
Sylvain et al.

(10) Patent No.: US 8,045,568 B2
(45) Date of Patent: Oct. 25, 2011

(54) ENTERPRISE MOBILITY

(75) Inventors: Dany Sylvain, Gatineau (CA); Cristian Constantinof, Kanata (CA)

(73) Assignee: Genband US LLC, Plano, TX (US)

( * ) Notice: Subject to any disclaimer, the term of this patent is extended or adjusted under 35 U.S.C. 154(b) by 784 days.

(21) Appl. No.: 11/536,921

(22) Filed: Sep. 29, 2006

(65) Prior Publication Data
US 2008/0144637 A1    Jun. 19, 2008

(51) Int. Cl.
*H04L 12/28* (2006.01)
(52) U.S. Cl. ......... 370/401; 370/402; 370/404; 370/408
(58) Field of Classification Search .......... 370/352, 370/401, 256, 390, 328, 338; 709/202, 227; 705/40
See application file for complete search history.

(56) References Cited

U.S. PATENT DOCUMENTS

| | | | |
|---|---|---|---|
| 5,497,411 | A | 3/1996 | Pellerin |
| 6,067,453 | A | 5/2000 | Adiwoso et al. |
| 6,208,627 | B1 | 3/2001 | Menon et al. |
| 6,353,596 | B1 | 3/2002 | Grossglauser et al. |
| 6,614,897 | B1 | 9/2003 | Curtis et al. |
| 6,721,565 | B1 | 4/2004 | Ejzak et al. |
| 6,801,615 | B2 | 10/2004 | Stumer et al. |
| 6,961,774 | B1 | 11/2005 | Shannon et al. |
| 6,970,459 | B1 | 11/2005 | Meier |
| 7,206,582 | B2 | 4/2007 | Tom et al. |
| 7,492,886 | B1 | 2/2009 | Kalmanek, Jr. et al. |
| 7,664,495 | B1 * | 2/2010 | Bonner et al. ............... 455/433 |
| 7,729,489 | B2 | 6/2010 | Lee et al. |
| 2002/0133600 | A1 | 9/2002 | Williams et al. |
| 2002/0188562 | A1 * | 12/2002 | Igarashi et al. ............... 705/40 |
| 2003/0027569 | A1 | 2/2003 | Ejzak |
| 2003/0148765 | A1 | 8/2003 | Ma et al. |
| 2003/0174688 | A1 | 9/2003 | Ahmed et al. |
| 2004/0028080 | A1 | 2/2004 | Samarasinghe et al. |
| 2004/0157600 | A1 | 8/2004 | Stumpert et al. |

(Continued)

FOREIGN PATENT DOCUMENTS

CA    2 501 991 A1    4/2004

(Continued)

OTHER PUBLICATIONS

International Search Report for PCT/IB2007/002787, mailed Mar. 7, 2008.

(Continued)

*Primary Examiner* — Hassan Phillips
*Assistant Examiner* — Anez Ebrahim
(74) *Attorney, Agent, or Firm* — Jenkins, Wilson, Taylor & Hunt, P.A.

(57) ABSTRACT

The present invention provides a service node, which extends the services of a carrier's multimedia subsystem (MS), such as an IP multimedia subsystem (IMS), to enterprise networks in an efficient and effective manner. As such, MS subscribers gain access to enterprise services in addition to the carrier's services provided via the carrier's circuit switched subsystems (CS) and packet subsystems (PS). The service node acts as a liaison between enterprise application servers and the MS, such that the enterprise application servers appear as MS application servers to the MS. The service node provides user identifier and protocol translation between enterprise and MS user identifiers and protocols, respectively. As such, enterprise application servers can access the MS as well as be accessed by the MS to support user mobility, with continuity of services, between the enterprise and carrier networks.

21 Claims, 13 Drawing Sheets

U.S. PATENT DOCUMENTS

| | | | |
|---|---|---|---|
| 2004/0246990 A1 | 12/2004 | Krishnamurthi et al. | |
| 2004/0249887 A1 | 12/2004 | Garcia-Martin et al. | |
| 2004/0266426 A1 | 12/2004 | Marsh et al. | |
| 2005/0002407 A1 | 1/2005 | Shaheen et al. | |
| 2005/0003821 A1 | 1/2005 | Sylvain | |
| 2005/0243870 A1 | 11/2005 | Balogh et al. | |
| 2005/0245261 A1 | 11/2005 | Ejzak | |
| 2005/0286531 A1 | 12/2005 | Tuohino et al. | |
| 2006/0002355 A1 | 1/2006 | Baek et al. | |
| 2006/0034270 A1 | 2/2006 | Haase et al. | |
| 2006/0083199 A1 | 4/2006 | Yang | |
| 2006/0187904 A1* | 8/2006 | Oouchi | 370/352 |
| 2006/0209794 A1* | 9/2006 | Bae et al. | 370/352 |
| 2006/0209805 A1 | 9/2006 | Mahdi | |
| 2006/0217112 A1 | 9/2006 | Mo | |
| 2007/0004415 A1 | 1/2007 | Abedi | |
| 2007/0014281 A1 | 1/2007 | Kant | |
| 2007/0041367 A1 | 2/2007 | Mahdi | |
| 2007/0058788 A1 | 3/2007 | Mahdi et al. | |
| 2007/0206568 A1* | 9/2007 | Silver et al. | 370/352 |
| 2008/0160991 A1 | 7/2008 | Constantinof et al. | |
| 2010/0124897 A1 | 5/2010 | Edge | |

FOREIGN PATENT DOCUMENTS

| | | |
|---|---|---|
| CN | 101292489 A | 11/2008 |
| EP | 1 920 572 A2 | 3/2007 |
| EP | 1 816 877 A1 | 8/2007 |
| WO | WO 00/60785 A1 | 10/2000 |
| WO | WO 01/03450 A1 | 1/2001 |
| WO | WO 01/22657 A1 | 3/2001 |
| WO | WO 2004/019173 A2 | 3/2004 |
| WO | WO 2004/073279 A1 | 8/2004 |
| WO | WO 2006/097837 A1 | 9/2006 |
| WO | WO 2006/105732 A1 | 10/2006 |
| WO | WO 2006/126072 A1 | 11/2006 |
| WO | WO 2007/023358 A2 | 3/2007 |

OTHER PUBLICATIONS

Chinese Official Action for Chinese patent application No. 200680039435.0 (Mar. 22, 2011).
Final Official Action for U.S. Appl. No. 11/378,776 (Mar. 7, 2011).
Final Official Action for U.S. Appl. No. 11/616,679, Feb. 25, 2011.
Official Action for U.S. Appl. No. 11/440,165 (Feb. 16, 2011).
Final Official Action for U.S. Appl. No. 11/466,115 (Oct. 12, 2010).
Official Action for U.S. Appl. No. 11/616,679 (Aug. 13, 2010).
European Search Reprot for EP 07024903 (Jul. 23, 2008).
3GPP SA WG2, "3$^{rd}$ Generation Partnership Project; Technical Specification Group Core Network and Terminals; Voice Call Continuity Between the Circuit-Switched (CS) Domain and the IP Multimedia (IP) Core Network (CN) Subsystem; Stage 3 (Release 7), TS 24.206 V.7.0.0," Technical Specification (TS), Dec. 8, 2006, pp. 1-114, vol. 24.206 No. V7.0.0, 3GPPP Organizational Partners' Publications Offices.
3GPP CT WG1, "3$^{rd}$ Gneration Partnership Project; Technical Specification Group Services and System Aspects; voice Call Continuity (VCC) Between Circuit Switched (CS) and IP Multimedia Subsystem (IMS); Stage 2 (Release 7), TS 23.206 V7.1.0," Technical Specification (TS), Dec. 1, 2006, pp. 1-36, vol. 23.206 No. V7.1.0, 3GPP Organizational Partner's Publications Offices.
International Search Report for PCT/IB2006/001564, Mailed Nov. 14, 2006).
3GPP SA WG2, "Voice Call Continuity Between CS and IMS Study (3GPP TR 23.806 version 7.00.0 Release 7)," Technical Specification (TS), Dec. 1, 2005, pp. 1-153, vol. 23.806 No. V7.0.0, 3GPP Organizational Partners' Publications Offices.
Official Action for U.S. Appl. No. 11/378,776 (Aug. 18, 2010).
Official Action for U.S. Appl. No. 11/440,165 (Aug. 4, 2010).
Official Action for U.S. Appl. No. 11/466,115 (Feb. 2, 2010).
Official Action for U.S. Appl. No. 11/466,115 (Jun. 23, 2009).
3GPP, "3$^{rd}$ Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008).
Notification Concerning Transmittal of International Preliminary Report on Patentability for International Application No. PCT/IB2006/002282 (Mar. 6, 2008).
International Search Report for PCT/IB2006/002282 (Feb. 2, 2007).
International Search Report for PCT/UB2006/001362 (Oct. 5, 2006).
International Search Report for PCT/IB2006/000607 (Aug. 28, 2006).
3GPP, "3$^{rd}$ Generation Partnership Project, Technical Specification Group Services and System Aspects; Voice Call Continuity Between CS and IMS; Stage 2 (Release 7)," 3GPP TS 23.206 V1.1.0 (Jul. 2006).
3GPP, "3$^{rd}$ Generation Partnership Project; Technical Specification Group Services and System Aspects; Multimedia Broadcast/Multicast Service (MBMS); Architecture and Functional Description (Release 6)," 3GPP TS 23.246 V6.10.0 (Jun. 2006).
3GPP, "3$^{rd}$ Generation Partnership Project; Technical Specification Group Services and System Aspects; Voice Call Continuity Between CS and IMS Study (Release 7)," 3GPP TR 23.806 V1.4.0 (Aug. 2005).
U.S. Appl. No. 60/690,843 (Jun. 15, 2005).
Strater et al., "Seamless Mobility Between Home Networks and Cable Service," Motorola White Paper (May 27, 2005).
3GPP, "3$^{rd}$ Generation Partnership Project; Universal Mobile Telecommunications System; Mobile Radio Interface Layer 3 Specification, Core Network Protocols—Stage 3," TS 24.008 V3.0.0 (Jul. 1999).

* cited by examiner

ENTERPRISE MOBILITY

FIELD OF THE INVENTION

The present invention relates to multimedia subsystems in a carrier network, and in particular to providing access to both enterprise and carrier services for subscribers of the multimedia subsystem.

BACKGROUND OF THE INVENTION

Telecommunication service providers are currently migrating circuit-switched voice services to packet networks, which use Voice over Internet Protocol (VoIP) to support services. In light of the multimedia capabilities afforded packet communications and in an effort to generate revenue, the service providers are offering a litany of communication related services along with the voice services. To control and track these services, the service providers are employing a service delivery platform referred to as the IP Multimedia Subsystem (IMS) and defined by the Third Generation Partnership Project (3GPP). Using the Session Initiation Protocol (SIP), the service providers are able to converge wireline and wireless services as well as support the legacy time division multiplexed (TDM) networks of the Public Switched Telephone Network (PSTN). The service providers are employing IMS as an integral part of their respective carrier networks. As such, IMS is hosted in the carrier network.

Traditionally, a significant source of revenue for service providers is derived from businesses, which generally have their own private networks. These private networks are generally referred to as enterprise networks and use their own addressing or numbering plan. Although enterprise networks are connected to the carrier networks of the PSTN, the interplay between the enterprise networks and the carrier networks has traditionally been limited. As IMS is being deployed, the interplay between the enterprise networks and the carrier networks remains limited because of addressing and security issues associated with the enterprise network.

In many instances, the enterprise network is capable of providing various services to authorized users that are not made available by the carrier network, and vice versa. Authorized users who have roamed outside of the enterprise network and are currently supported by the carrier network no longer have access to the enterprise services that are available to those within the enterprise network. Those users that are served by the enterprise network cannot take advantage of the services provided by the carrier network. As such, there is a need for a way to allow authorized users to gain access to enterprise and carrier services regardless of their location. There is a further need for a way to facilitate greater interaction between enterprise and carrier networks and resolve the addressing issues caused by the different and often incompatible addressing schemes of the respective networks.

SUMMARY OF THE INVENTION

The present invention provides a service node, which extends the services of a carrier's multimedia subsystem (MS), such as an IP multimedia subsystem (IMS), to enterprise networks in an efficient and effective manner. As such, MS subscribers gain access to enterprise services in addition to the carrier's services provided via the carrier's circuit-switched subsystems (CS) and packet subsystems (PS). The service node acts as a liaison between enterprise application servers and the MS, such that the enterprise applications can be made available to users in the MS domain. The service node provides address and protocol translation between enterprise and MS addresses and protocols, respectively. As such, enterprise application servers can access the MS as well as be accessed by the MS to support user mobility, with continuity of service, between the enterprise and carrier networks.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
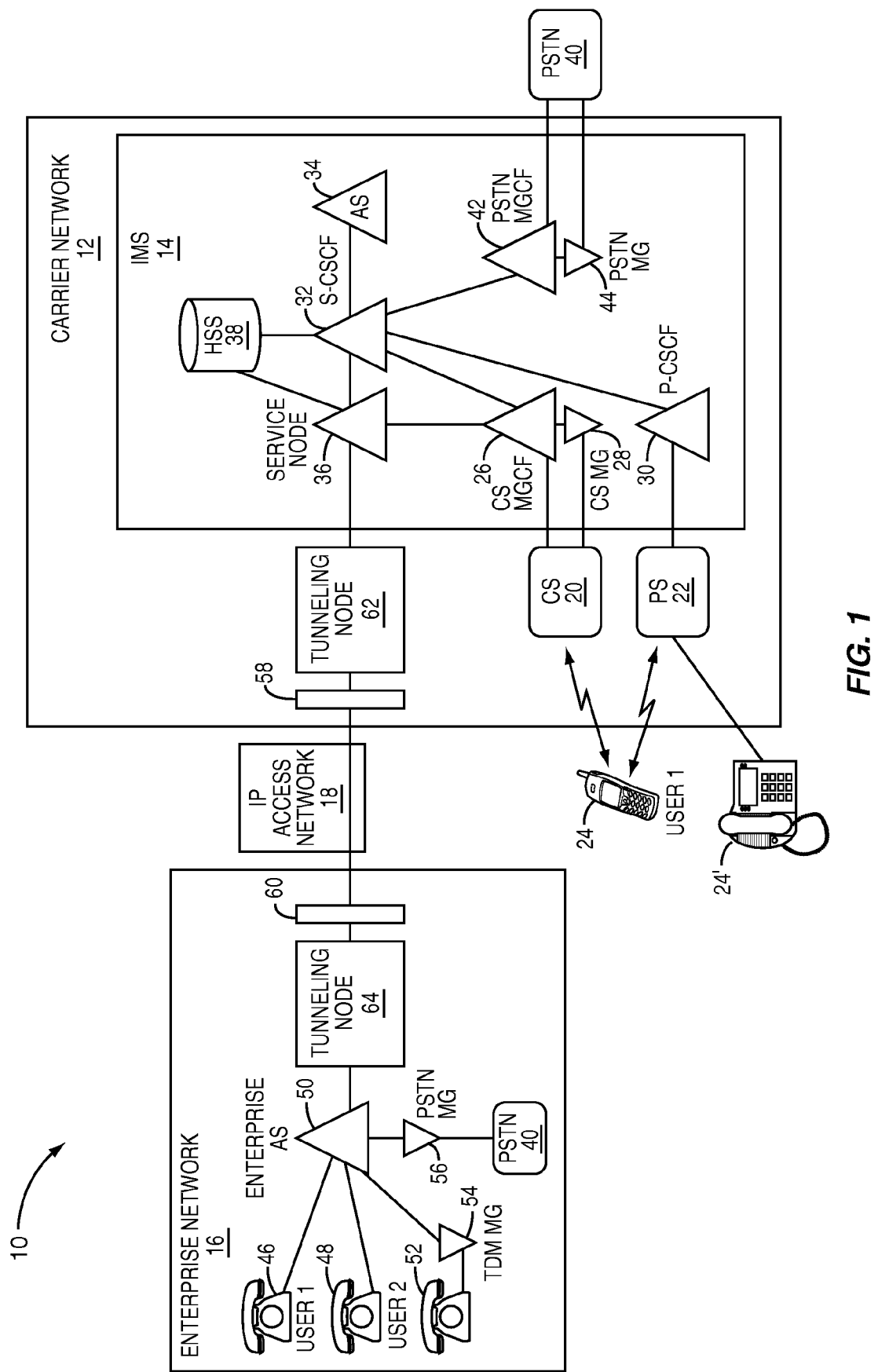
FIG. 1 is a block representation of a communication environment in which the present invention may be employed according to one embodiment.

The present invention provides a service node that extends the services of a carrier's multimedia subsystem (MS), such as an IP multimedia subsystem (IMS), to enterprise networks or other non-MS networks in an efficient and effective manner. As such, MS subscribers gain access to enterprise services in addition to the carrier's services provided by the carrier's circuit-switched subsystems (CS) and packet subsystems (PS). The service node acts as a liaison between enterprise application servers and the MS, such that the enterprise applications can be made available to users in the MS domain. The service node provides address and protocol translation between enterprise and MS addresses and protocols, respectively. As such, enterprise application servers can access the MS as well as be accessed by the MS to support user mobility, with continuity of service, between the enterprise and carrier networks. Prior to delving into the details of the present invention, an overview of a communication environment 10 in which the present invention may be employed is illustrated in FIG. 1.

The communication environment 10 includes a carrier network 12, which employs a multimedia subsystem, such as an IMS 14. A non-carrier enterprise network 16 is coupled to the carrier network 12 through an appropriate IP access network 18. The carrier network 12 provides a CS 20 and PS 22 to facilitate circuit-switched and packet-based wireline and wireless communications with various mobile and fixed terminals, including mobile terminal 24, which is associated with User 1, and fixed terminal 24'. Since the IMS 14 is a session control architecture, session (including call) signaling is passed through an appropriate media gateway control function (MGCF) 26 into the IMS 14. A CS MGCF 26 is closely associated with a CS media gateway (MG) 28. In essence, call signaling that is exchanged between the CS 20 and the IMS 14 is passed through the CS MGCF 26, which will control the CS media gateway 28 to establish a bearer path between the CS 20 and an associated packet network in light of the call signaling. For packet-based access, the PS 22 may interact with the IMS 14 through a proxy call/session control function (P-CSCF) 30.

In the illustrated embodiment, SIP is used for session signaling throughout the IMS 14. Further, a particular subscriber or subscriber device, such as the mobile terminal 24, may be assigned a serving CSCF (S-CSCF) 32 through which most, if not all, session signaling is routed. The S-CSCF 32 may access various application servers 34 when processing session signaling. In many instances, the session signaling may be routed through a particular application server (AS) 34, which will employ a particular service by modifying session signaling messages. Generally, these application servers 34 reside within the IMS 14.

For the present invention, a service node 36 is employed to act as a liaison between the IMS 14 and other non-carrier or non-IMS application servers, which will be discussed in greater detail below. In essence, the service node 36 will appear as an IMS application server on behalf of these non-carrier and non-IMS application servers. The IMS 14 will also include a home subscriber service (HSS) 38, which will assist in identifying a S-CSCF for a subscriber device, as well as keep associations between a subscriber device and session control nodes within the IMS 14.

In a fashion similar to interfacing with the CS 20, the IMS 14 may also interface with the public switched telephone network (PSTN) 40 through an appropriate PSTN MGCF 42 and associated PSTN media gateway 44. As such, session signaling is passed between the S-CSCF 32 and the PSTN 40 via the PSTN MGCF 42. The PSTN MGCF 42 will control the PSTN media gateway 44 to control the bearer path between a circuit-switched leg extending to the PSTN 40 and a packet session extending through a packet network associated with the IMS 14.

The enterprise network 16 is illustrated as having various types of user terminals, as well as a connection to the PSTN 40. Assume a first user terminal 46 is associated with User 1 and is a packet-based communication device. Further assume that the second user terminal 48 is associated with User 2 and is also a packet-based communication device. Both the first user terminal 46 and the second user terminal 48 are supported by an enterprise application server 50, which handles session signaling to control communications within the enterprise network 16. Although the enterprise network 16 is packet-centric, traditional time division multiplex (TDM) based user terminals may also be supported. As illustrated, a third user terminal 52 is illustrated as being supported by a TDM media gateway 54, which interfaces with the enterprise application server 50. The enterprise application server 50 may support any number of communication services, which are not limited to voice-based communications. Notably, the enterprise application server 50 is an exemplary non-carrier, non-IMS application server capable of accessing the IMS 14 and being accessed by the IMS 14 via the service node 36. The service node 36 will appear as an application server to the IMS 14 on behalf of the enterprise application server 50. Further details are provided below. The enterprise network 16 may also have access to the PSTN 40 through an appropriate PSTN media gateway 56.

Also illustrated in FIG. 1 are a carrier firewall 58 between the IP access network 18 and the carrier network 12, and an enterprise firewall 60 between the IP access network 18 and the enterprise network 16. In one embodiment, a tunneling mechanism, such as a virtual private network (VPN) is employed to provide a path through the carrier firewall 58 and the enterprise firewall 60 and to secure the link over the IP access network. The endpoints of the tunnel through the carrier firewall 58 and enterprise firewall 60 are represented by the tunneling nodes 62 and 64, respectively.

To illustrate the concepts of the present invention, various examples are provided to illustrate how calls may be originated from and received by the first user terminal 46, which resides in the enterprise network 16. Select ones of these examples also illustrate the interplay of an associated mobile terminal 24, which is outside of the enterprise network 16 and capable of providing communications via the CS 20 as well as the PS 22.

Figure 2A:
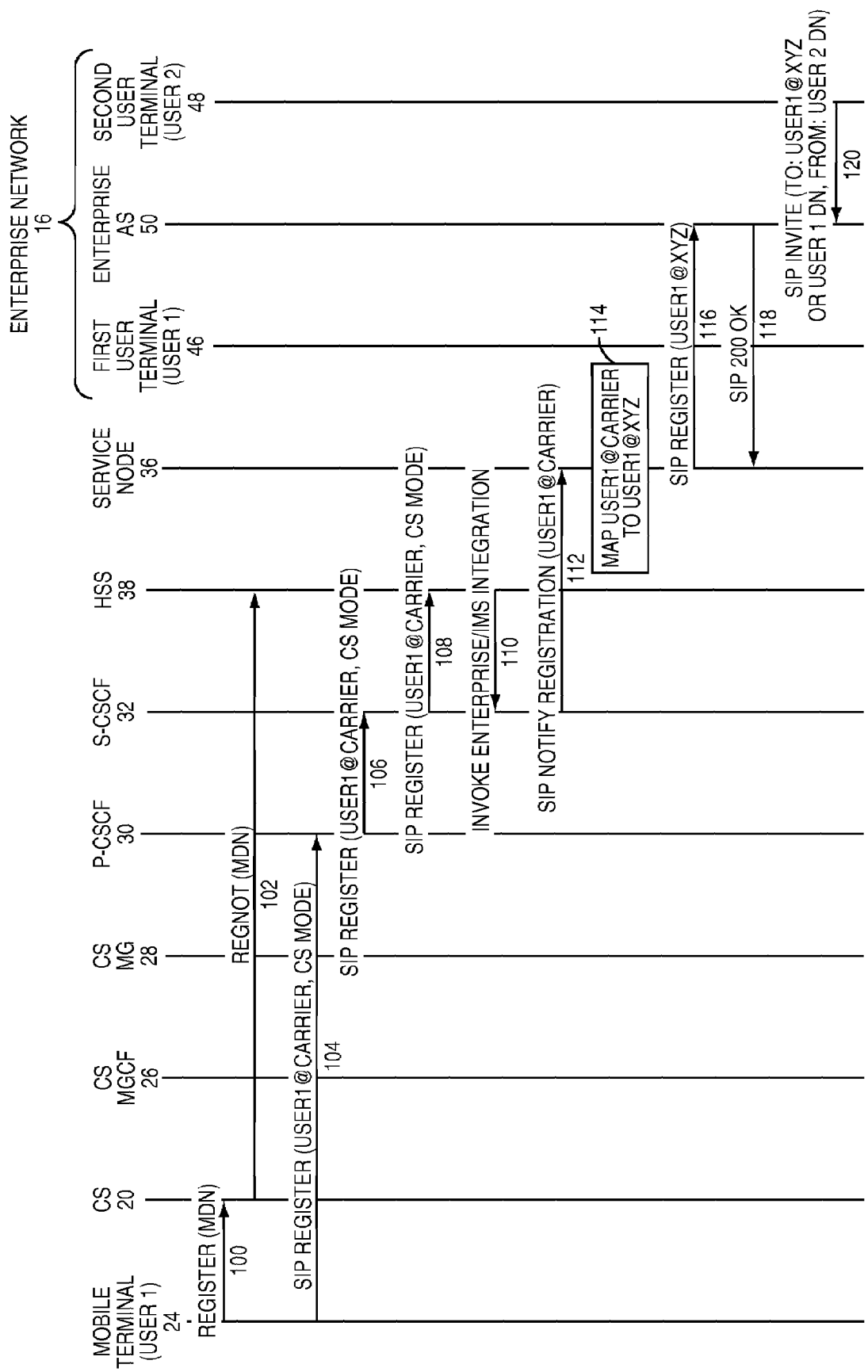
FIGS. 2A-2C are a call flow wherein a mobile terminal registers with an IMS for call services via a CS, wherein the mobile terminal may also receive services from an enterprise network.
Figure 2B:
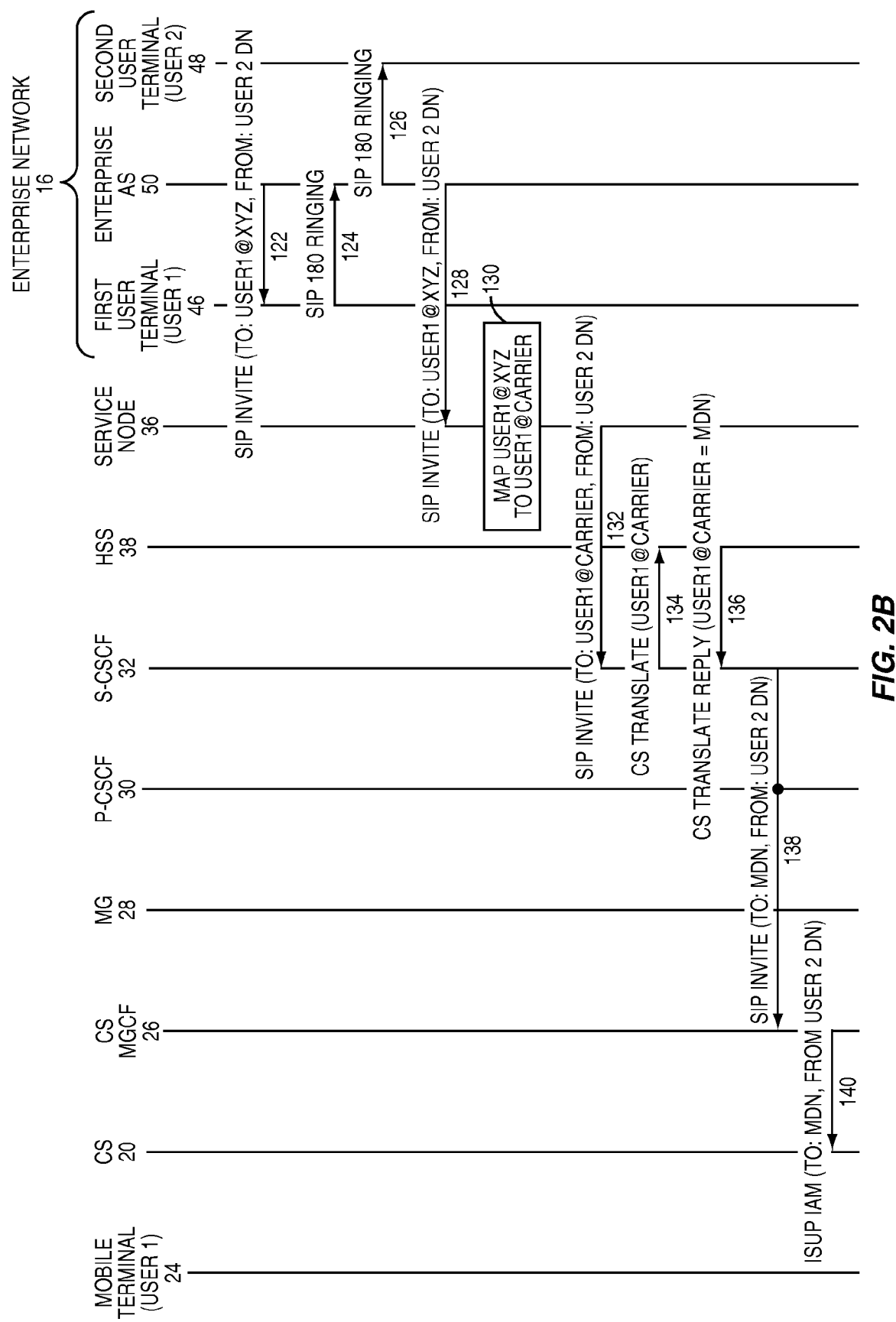
Figure 2C:
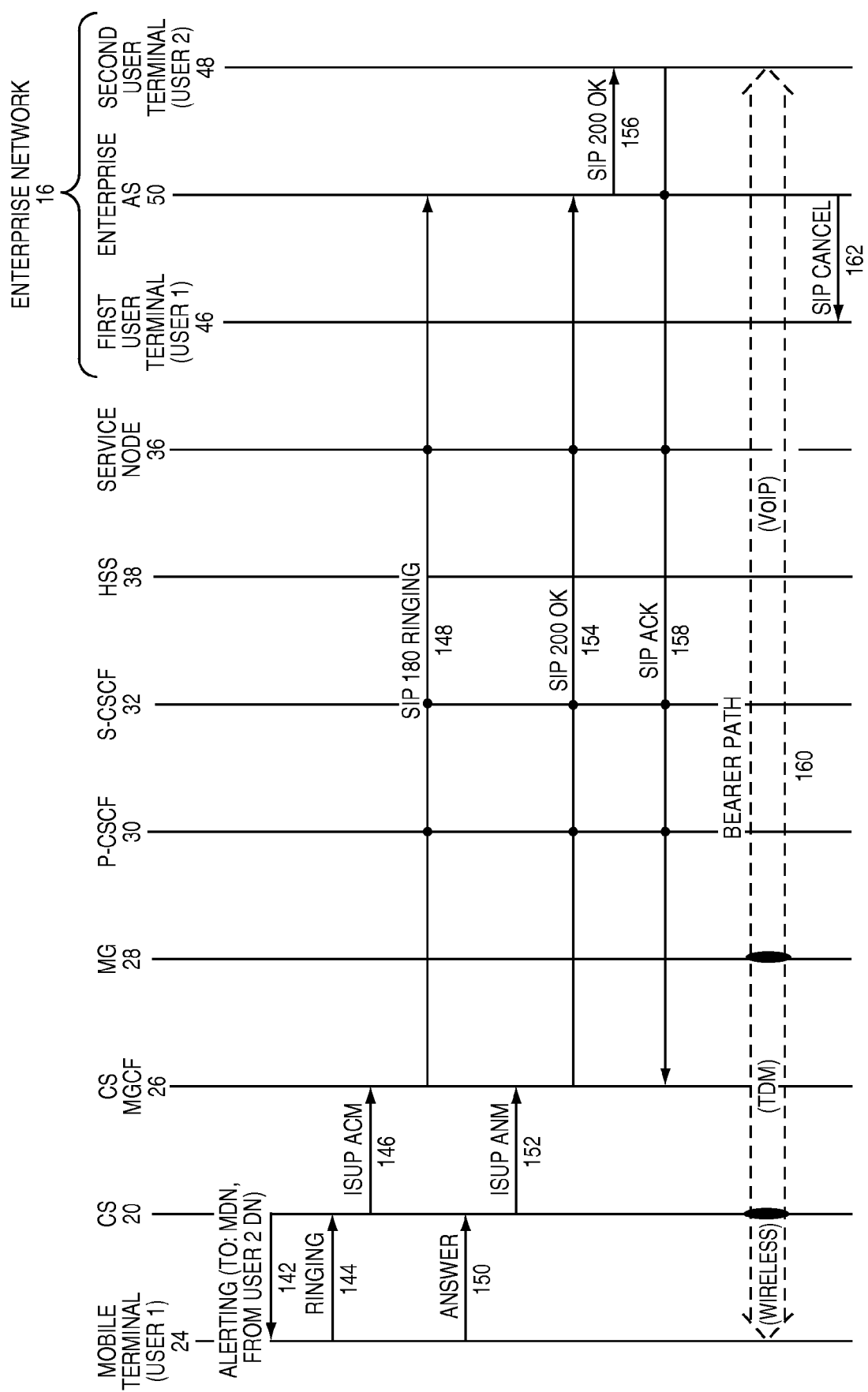

The first example is provided in the communication flow of FIGS. 2A-2C. The communication flows in this description have been simplified to show only the main messages. The communication flow illustrates a scenario where the mobile terminal 24 of User 1 registers with the IMS 14 in a fashion indicating that incoming calls directed toward the mobile terminal 24 should employ a bearer path via the CS 20, and not the PS 22. This scenario represents a case where the PS 22 may not have sufficient resources to support a voice-over-packet (VoP) session in general, or based on current network conditions. Once the mobile terminal 24 is registered, User 2 initiates a call to the first user terminal 46 of User 1 from the second user terminal 48. Upon receiving the call initiated from the second user terminal 48, the enterprise application server 50 will present the call to both registered devices, the first user terminal 46 in the enterprise network 16 and to the mobile terminal 24 via the IMS 14. After the incoming call is presented to the first user terminal 46 and the mobile terminal 24, the example assumes that the call is answered by the mobile terminal 24 and a bearer path is established via the CS 20. The details of the communication flow follow.

Initially, the mobile terminal 24 of User 1 will register with the CS 20 by sending a CS Register message including the mobile directory number (MDN) associated with the mobile terminal 24 to the CS 20 (step 100). The CS 20 may be configured to provide a Registration Notification (REGNOT) for the mobile terminal 24 using the MDN to the HSS 38 (step 102). The HSS 38 will keep track of the registration of the mobile terminal 24 with the CS 20. The mobile terminal 24 may also register with the IMS 14 via the PS 22. In particular, the mobile terminal 24 may send a SIP Register message to the P-CSCF 30 (step 104), which will forward the SIP Register message to the S-CSCF 32 (step 106). The S-CSCF 32 will forward the SIP Register message to the HSS 38 (step 108), which will keep track of the registration of User 1 in association with the mobile terminal 24 with the IMS 14. Notably, the SIP Register message will identify the carrier user identifier of User 1 (USER1@CARRIER), and indicate that the mobile terminal 24 used by User 1 is operating in a CS mode. The user identifier may be a uniform resource locator (URL), directory number, or other appropriate identification information. The CS mode indicates that calls should be directed to the mobile terminal 24 through the CS 20, and not through the PS 22.

In addition to registering User 1, the HSS 38 will recognize that USER 1 desires to invoke integration of the services of the enterprise network 16 and IMS 14. In particular, the HSS 38 will recognize that the enterprise application server 50 of the enterprise network 16 must be employed. As such, the S-CSCF 32 is instructed to forward the registration to the enterprise application server 50 (step 110). The S-CSCF 32 will then send a SIP Notify Registration message using the carrier address user identifier of User 1 to the service node 36 (step 112). The service node 36 will map the carrier identifier for User 1 to an enterprise identifier for User 1 (step 114), and send a SIP Register message to the enterprise application server 50 using the enterprise identifier for User 1 (USER1@XYZ) (step 116). As such, User 1 is effectively registered with the enterprise application server 50, even though it is being served by the CS 20 of the carrier network 12 and IMS 14. Upon registration, the enterprise application server 50 may respond by sending a SIP 200 OK message back to the service node 36 in traditional SIP form (step 118).

Next, assume that User 2 initiates a call from the second user terminal 48 toward the enterprise identifier associated with User 1. Again, the term "identifier" may be used to represent a traditional URL or an associated directory number. The directory number associated with the second user terminal 48 is an enterprise number, which is not generally recognizable by the carrier network 12. To initiate the call, assume the second user terminal 48 sends a SIP Invite message toward the enterprise application server 50 (step 120). The SIP Invite message indicates that a session is being initiated to the enterprise identifier associated with User 1 (USER1@XYZ) from the identifier or directory number associated with User 2 (USER2 DN). The enterprise application server 50 will recognize that User 1 has employed call processing rules to have the call presented to all registered terminals associated with User 1.

As such, the enterprise application server 50 will route the call toward the first user terminal 46 as well as the mobile terminal 24. To route the call toward the first user terminal 46, the enterprise application server 50 will forward the SIP Invite message toward the first user terminal 46 (step 122), which will recognize that an incoming call is being presented and begin alerting User 1 that the incoming call is being presented. The first user terminal 46 will send a SIP 180 Ringing message back to the enterprise application server 50 in response to the SIP Invite message to indicate that the first user terminal 46 is alerting User 1 (step 124). The enterprise application server 50 will then forward the SIP 180 Ringing message to the second user terminal 48 (step 126).

Meanwhile, the enterprise application server 50 will also route the call to the mobile terminal 24. To route the call to the mobile terminal 24, the enterprise application server 50 will forward a SIP Invite message to the service node 36, which acts as a registered application server on behalf of User 1 (step 128). The service node 36 will provide the requisite address translation by mapping the enterprise address for User 1 (USER1@XYZ) to the carrier address of User 1 (USER1@CARRIER) (step 130). The service node 36 will then send a SIP Invite message to the S-CSCF 32 of the IMS 14 using the carrier identifier of User 1 (step 132). The S-CSCF 32 may send a message to the HSS 38 to translate the carrier address to a current MDN (step 134). The HSS 38 will respond by providing the S-CSCF 32 with the mobile directory number corresponding to the carrier address (step 136). The S-CSCF 32 may then forward the SIP Invite toward the CS MGCF 26 via the P-CSCF 30, which is supporting the MDN of the mobile terminal 24 (step 138). The CS MGCF 26 will then provide an appropriate Integrated Services User Part (ISUP) Initial Address Message (IAM) to the CS 20 using the MDN (step 140). The CS 20 will respond by providing an Alerting message to the mobile terminal 24 (step 142), which will begin alerting User 1. In response, the mobile terminal 24 will provide a Ringing message back to the CS 20 (step 144), which will send an ISUP Address Complete Message (ACM) to the CS MGCF 26 (step 146). The CS MGCF 26 will then send a SIP 180 Ringing message back toward the enterprise application server 50 through the P-CSCF 30, S-CSCF 32, and service node 36 (step 148).

If the call is answered by User 1 at the mobile terminal 24, the mobile terminal 24 will send an Answer message to the CS 20 (step 150), which will forward an ISUP Answer Message (ANM) to the CS MGCF 26 (step 152). The CS MGCF 26 will send an appropriate SIP 200 OK message toward the enterprise application server 50 via the P-CSCF 30, S-CSCF 32, and service node 36 (step 154). Notably, the service node 36 will provide the requisite identifier translation between carrier identifier and enterprise identifier, as well as any necessary protocol conversion for all messages passing therethrough. The protocol conversion may entail converting between different versions of SIP.

The enterprise application server 50 will then forward a SIP 200 OK message to the second user terminal 48 to indicate that the call has been answered by the mobile terminal 24 (step 156). Notably, the Session Data Protocol (SDP) of the SIP 200 OK messages is used to exchange the communication capabilities and parameters necessary to establish communications between the CS media gateway 28 and the second user terminal 48. The second user terminal 48, upon receipt of the SIP 200 OK message, will forward a SIP Acknowledgement message (ACK) toward the CS MGCF 26 via the enterprise application server 50, service node 36, S-CSCF 32, and P-CSCF 30 (step 158). Again, the service node 36 will provide the requisite address and protocol translations.

At this point, a bearer path is established between the second user terminal 48 and the mobile terminal 24 via the CS 20 (step 160). In particular, a wireless connection is established between the mobile terminal 24 and the CS 20; a TDM connection is established between the CS 20 and the CS media gateway 28, which is associated with the CS MGCF 26; and a voice-over-Internet-Protocol (VoIP) connection is established between the CS media gateway 28 and the second user terminal 48 to form a three-component bearer path. Once the enterprise application server 50 recognizes that the mobile terminal 24 has been answered and a bearer path has been successfully established between the mobile terminal 24 and the second user terminal 48, the enterprise application server 50 may send a SIP Cancel message toward the first user terminal 46 to indicate that the incoming call is no longer being presented to the first user terminal 46 (step 162).

From the above, the IMS 14 may register users with the enterprise application server 50 to gain access to services provided by the enterprise network 16. Once registered, the enterprise application server 50 may also interact with services of the IMS 14.

Figure 3A:
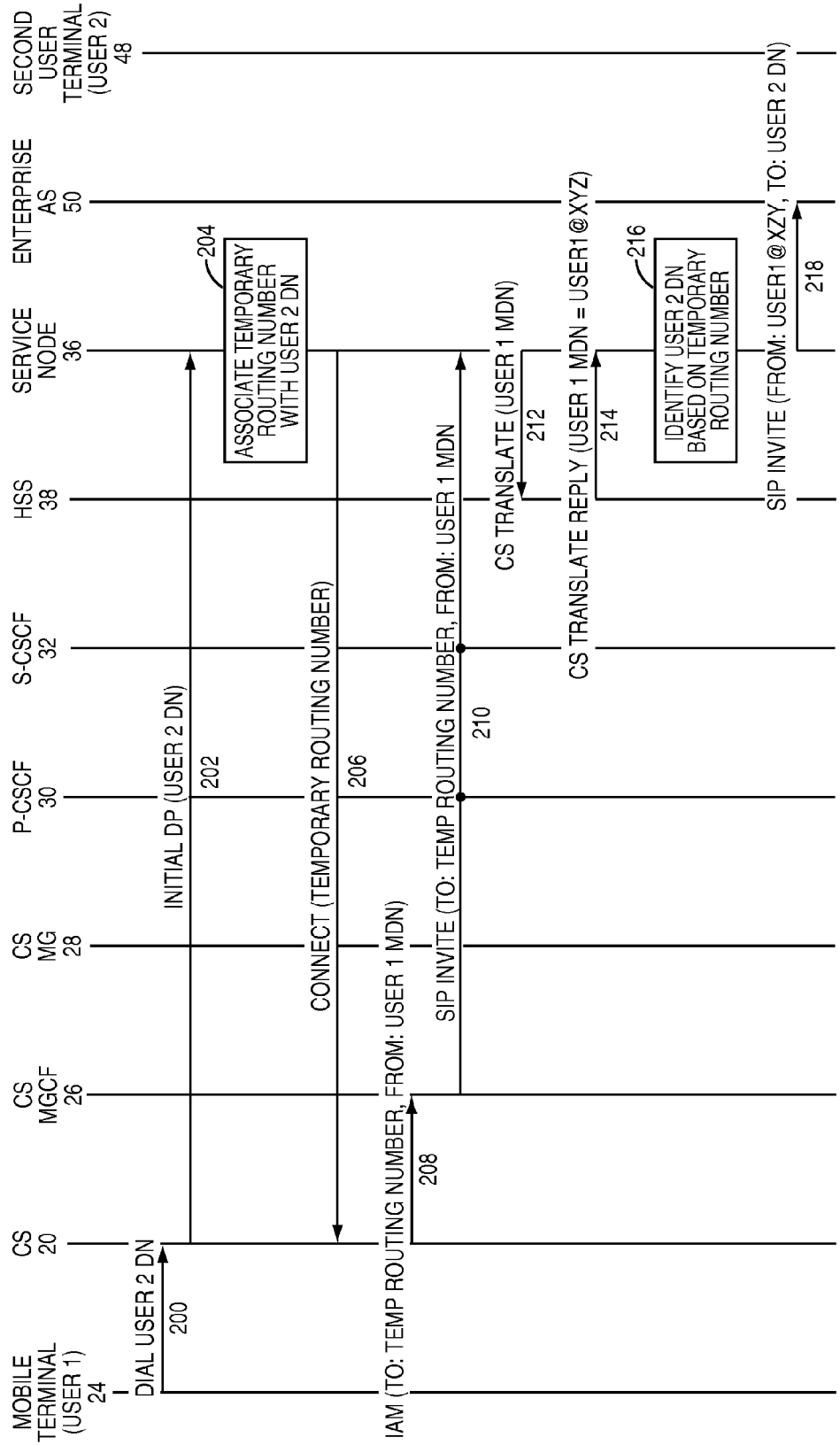
FIGS. 3A and 3B are a call flow wherein a mobile terminal initiates a call via a CS to a user terminal residing in an enterprise network.
Figure 3B:
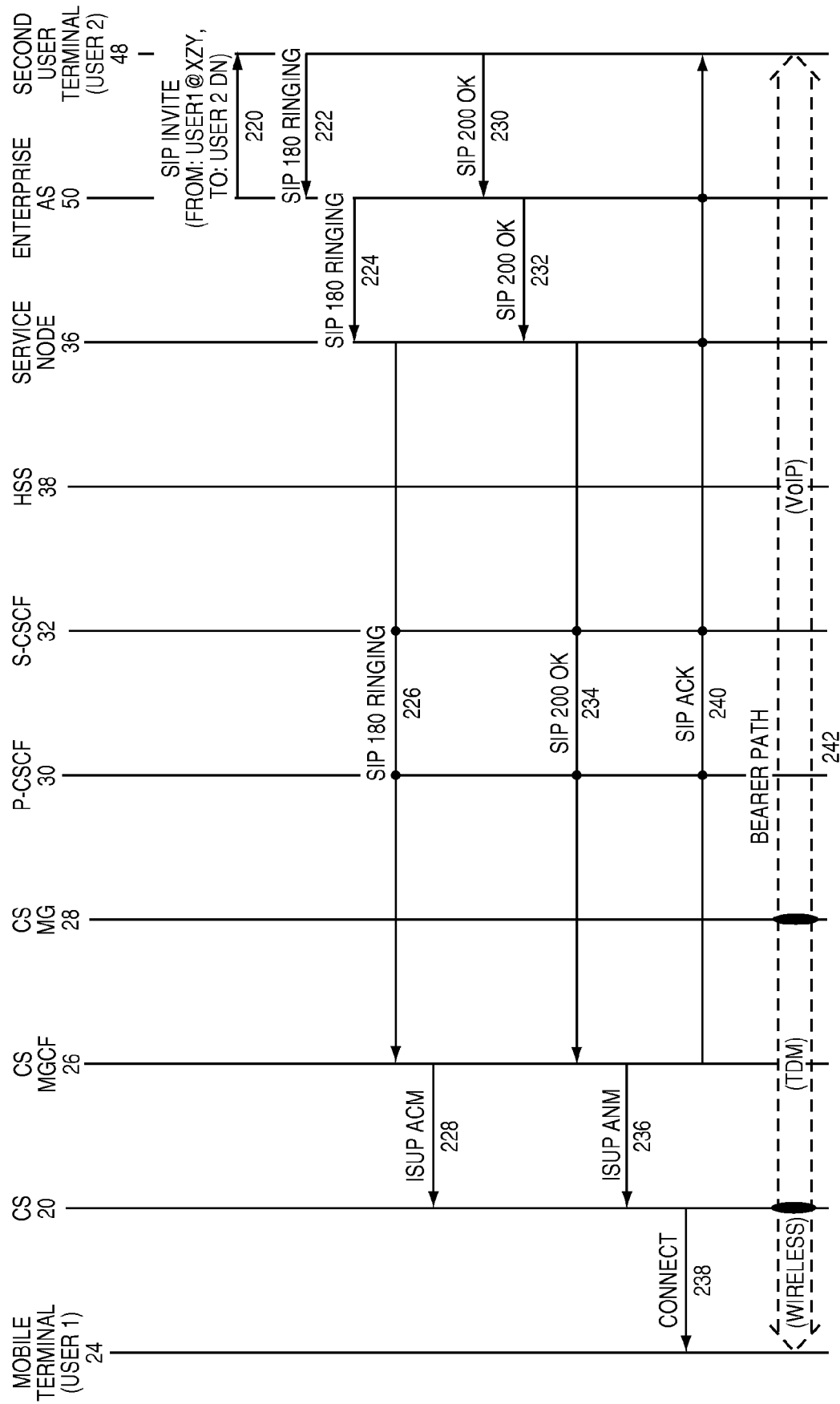

With reference to FIGS. 3A and 3B, a communication flow is provided for a scenario where the mobile terminal 24 initiates a call via the CS 20 to the second user terminal 48, which resides in the enterprise network 16. Initially, the mobile terminal 24 will present the dialed DN for User 2 or the second user terminal 48 to the CS 20 (step 200). The CS 20, and in particular a mobile switching center in this example, will provide an Initial Dialed Pulses (DP) message identifying User 2's directory number to the service node 36 (step 202). The service node 36 will associate a temporary routing number with User 2's DN (step 204), wherein the temporary routing number identifies the CS MGCF 26 to which the call should be routed. The service node 36 will provide the temporary routing number in a Connect message, which is sent back to the CS 20 (step 206).

Armed with the temporary routing number, the CS 20 will route an IAM to the CS MGCF 26 using the temporary routing number (step 208). The IAM will indicate that the call is being originated from User 1's MDN. The CS MGCF 26 will respond to receiving the IAM by sending a SIP Invite message into the IMS 14. In particular, the SIP Invite message is passed through the P-CSCF 30 to the S-CSCF 32, which will route the SIP Invite to the service node 36 (step 210). The service node 36 may access the HSS 38 to identify the enterprise address for User 1 (USER1@XYZ) based on User 1's MDN, which was provided in the SIP Invite message. In this case, the service node 36 will send a CS Translate message identifying User 1's MDN to the HSS 38 (step 212), which will respond with a CS Translate Reply message identifying User 1's enterprise address as being associated with User 1's MDN (carrier identifier) (step 214). The service node 36 will then identify User 2's DN based on the temporary routing number previously stored when the CS 20 obtained the temporary routing number (step 216).

At this point, the service node 36 has obtained User 1's enterprise identifier (USER1@XYZ) and previously stored User 2's enterprise identifier (USER 2 DN). As such, the service node 36 has the enterprise identifier for the originating and terminating devices, and can provide an appropriate SIP Invite to the enterprise application server 50 (step 218). The enterprise application server 50 will forward the SIP Invite to the second user terminal 48 (step 220), which will begin alerting User 2 that an incoming call is being presented. The second user terminal 48 will respond by sending a SIP 180 Ringing message back to the enterprise application server 50 (step 222), which will forward the SIP 180 Ringing message to the service node 36 (step 224). The service node 36 will provide the necessary address translations between the enterprise and carrier networks 16, 14 to forward the SIP 180 Ringing message toward the CS MGCF 26 via the S-CSCF 32 and the P-CSCF 30 (step 226). In response, the CS MGCF 26 will send an ISUP ACM into the CS 20 (step 228).

When User 2 answers the call, the second user terminal 48 will send a SIP 200 OK message to the enterprise application server 50 (step 230), which will forward the SIP 200 OK message to the service node 36 (step 232). The service node 36 will provide the requisite identifier and protocol translations, and forward the SIP 200 OK message toward the CS MGCF 26 via the S-CSCF 32 and the P-CSCF 30 (step 234).

The CS MGCF 26 will send an ISUP ANM to the CS 20 (step 236), which will send a Connect message to the mobile terminal 24 to enable the circuit-switched portion of the bearer path (step 238). The CS MGCF 26 will send a SIP Acknowledgement message back toward the second user terminal 48 via the P-CSCF 30, S-CSCF 32, service node 36, which will provide the requisite identifier and protocol translations, and the enterprise application server 50 (step 240). At this point, a bearer path is established between the mobile terminal 24 and the second user terminal 48 via the CS 20 (step 242). In particular, a wireless connection is established between the mobile terminal 24 and the CS 20; a TDM-based connection is established between the CS 20 and the CS media gateway 28; and a VoIP session is established between the CS media gateway 28 and the second user terminal 48.

Figure 4A:
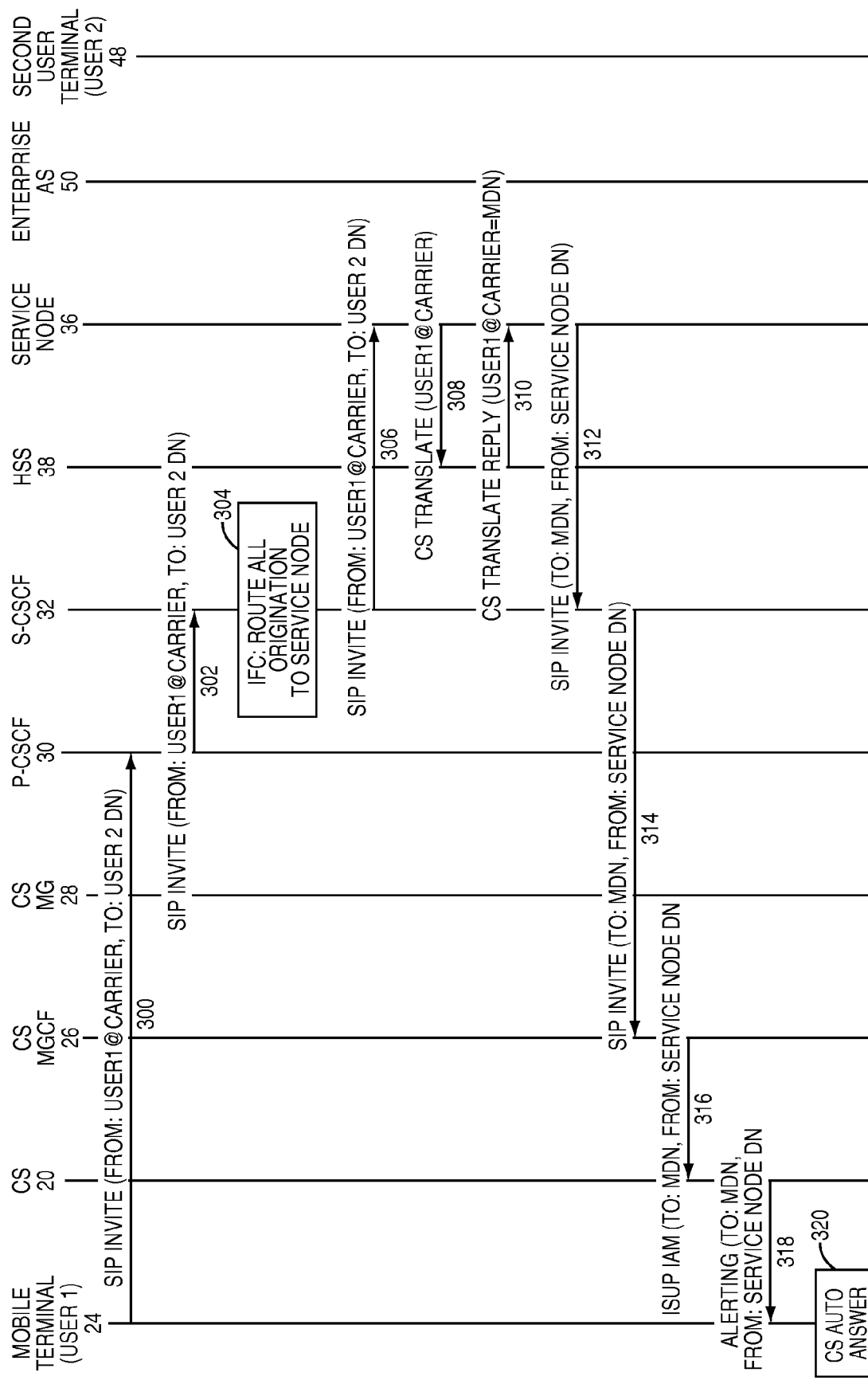
FIGS. 4A and 4B are a call flow wherein a mobile terminal initiates a call via a PS to a user terminal residing in an enterprise network, wherein the bearer path for the call will be supported by a CS.
Figure 4B:
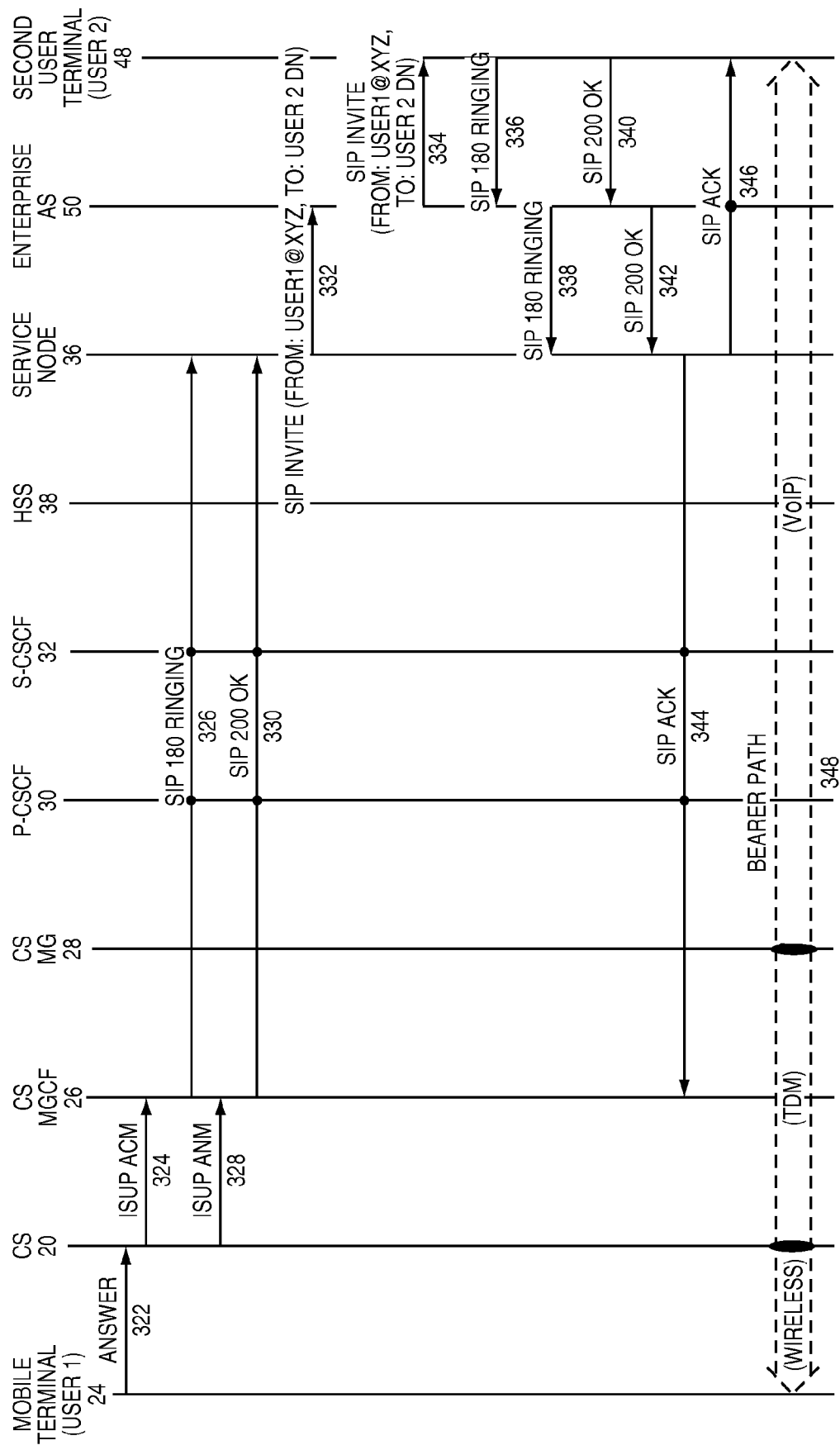

In the above embodiment, the outbound call from the mobile terminal 24 is initiated and established through the CS 20. The CS 20 is configured to interact with the IMS 14, which will invoke the service node 36 to gain access to the enterprise network 16. In the following example, a call is initiated from the mobile terminal 24 to the second user terminal 48 via the PS 22, yet the bearer path is established via the CS 20. An exemplary communication flow is provided in FIGS. 4A and 4B for such a scenario.

Initially, the mobile terminal 24 will send a SIP Invite to initiate a session from the mobile terminal 24 using its carrier identifier (USER1@CARRIER) to the enterprise identifier associated with the second user terminal 48 (USER 2 DN). The SIP Invite is received via the PS 22 at the P-CSCF 30 (step 300), which will forward the SIP Invite to the S-CSCF 32 (step 302). The internal filter criteria (IFC) of the S-CSCF 32 dictates that all call originations for the mobile terminal 24 are to be routed to the service node 36 (step 304). As such, the S-CSCF 32 will forward the SIP Invite to the service node 36 (step 306), which will access the HSS 38 to identify the MDN associated with the mobile terminal 24 based on User 1's carrier address (steps 308 and 310). The service node 36 will then process the SIP Invite to indicate that the session is intended for the MDN associated with the mobile terminal 24 and originated by the service node 36. The service node 36 will then forward the modified SIP Invite message to the S-CSCF 32 (step 312), which will forward the SIP Invite message to the CS MGCF 26 (step 314), associated with the MDN of the mobile terminal 24. In response, the CS MGCF 26 will send an ISUP IAM into the CS 20 to initiate a call to the mobile terminal 24 via the CS 20 (step 316). The CS 20 will present an Alerting message to the mobile terminal 24 to indicate that a call is being presented, and that the call was originated from the service node 36 (step 318).

The mobile terminal 24 is configured to automatically answer the incoming call presented via the CS 20 (step 320). The mobile terminal 24 will provide an Answer message back to the CS 20 when the call is answered (step 322). The CS 20 will then forward an ISUP ACM toward the CS MGCF 26 (step 324), which will send a SIP 180 Ringing message to the service node 36 via the P-CSCF 30 and the S-CSCF 32 (step 326). The CS 20 will subsequently send an ISUP ANM toward the CS MGCF 26 (step 328), which will send a SIP 200 OK message toward the service node 36 via the P-CSCF 30 and the S-CSCF 32 to indicate that the call has been answered (step 330). The SIP 200 OK message is the traditional SIP response in light of the Invite message initiated from the service node 36.

Upon receipt of the SIP 200 OK message, the service node 36 will create a SIP Invite message corresponding to the SIP Invite message initiated by the mobile terminal 24. Instead of the SIP Invite message identifying the carrier address associated with the mobile terminal 24 (USER1@CARRIER), the service node 36 will use the enterprise address for the mobile terminal 24 (USER1@XYZ) to identify the originator of the call. As such, the SIP Invite message indicates that the session is being established from a corresponding enterprise address of the mobile terminal 24 to the enterprise address associated with the second user terminal 48. The SIP Invite message is then forwarded to the enterprise application server 50 (step 332), which will forward the SIP Invite message to the second user terminal 48 (step 334). The second user terminal 48 will alert User 2 of the incoming call, and send a SIP 180 Ringing message to the enterprise application server 50 (step 336), which will forward the SIP 180 Ringing message to the service node 36 (step 338).

When the second user terminal 48 is answered, a SIP 200 OK message is sent to the enterprise application server 50 (step 340), which will forward the SIP 200 OK message to the service node 36 (step 342). At this point, the service node 36 will respond to the 200 OK message of step 330 by sending a SIP Acknowledgement message toward the CS MGCF 26 via the S-CSCF 32 and the P-CSCF 30 (step 344). The service node 36 will also send a SIP Acknowledgement message in response to the SIP 200 OK message of step 342 toward the second user terminal 48 via the enterprise application server 50 (step 346). At this point, a bearer path is established between the mobile terminal 24 and the second user terminal 48 via the CS 20 and the CS media gateway 28, which is associated with the CS MGCF 26 (step 348). Again, the bearer path will include wireless, TDM, and VoIP segments. As indicated from the above, the service node 36 is capable of invoking a CS-based bearer path through the CS 20, even if the call is initiated via the PS 22.

Figure 5:
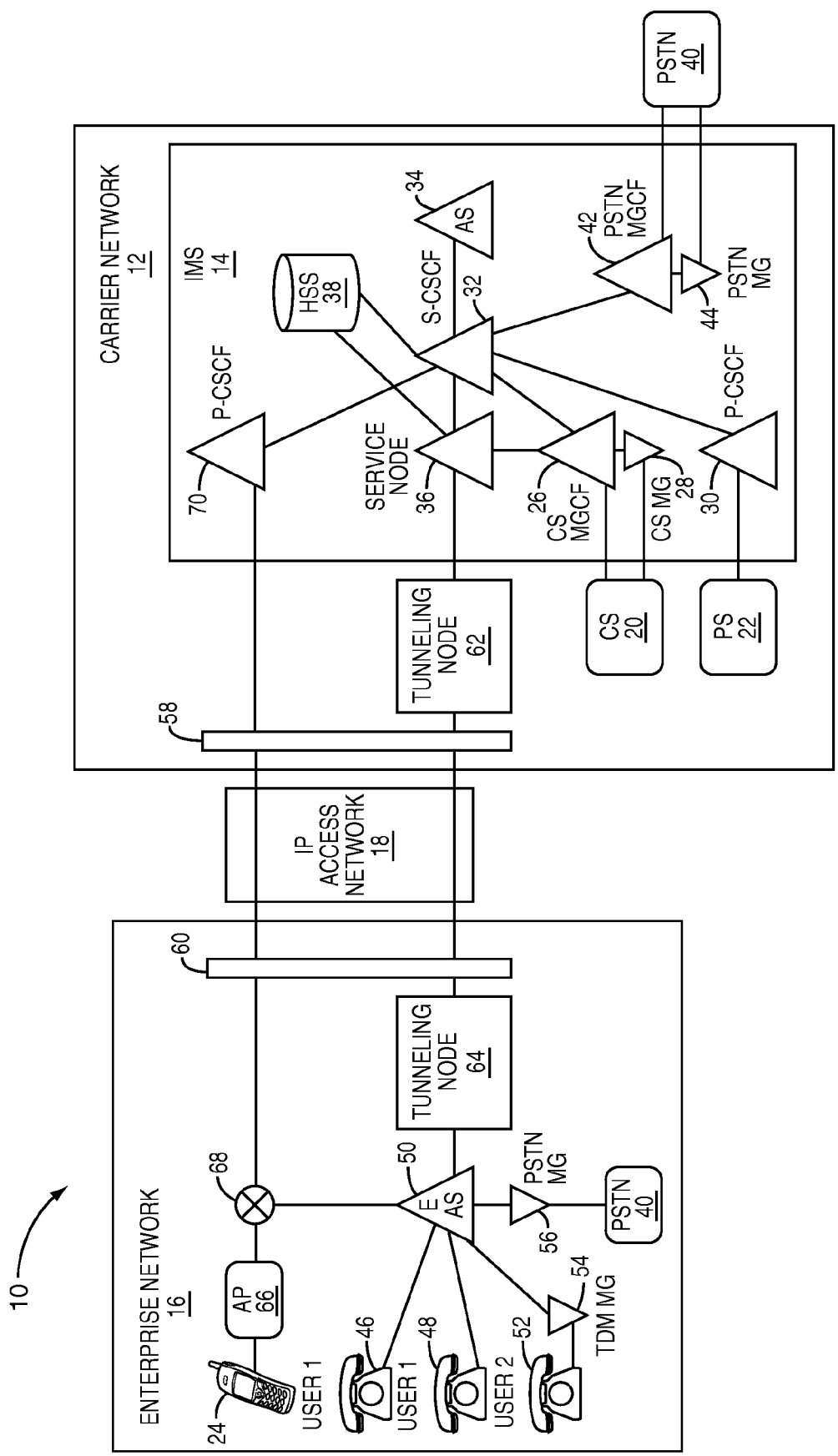
FIG. 5 is a block representation of a communication environment in which the present invention may be employed according to a second embodiment.

With reference to FIG. 5, the mobile terminal 24 may be supported by an access point 66 within the enterprise network 16. The access point 66 is associated with an appropriate router or switch 68, which is further coupled to the enterprise application server 50, as well as a path toward the carrier network 12 via the enterprise firewall 60 and the carrier firewall 58. As illustrated, the signaling path into the carrier network 12 may lead to a P-CSCF 70, which is used to support the mobile terminal 24 within the enterprise network 16. In this embodiment, there is no secure tunneling for the signaling path for the mobile terminal 24 through the enterprise firewall 60 and the carrier firewall 58. Notably, different embodiments may or may not employ secure tunnels between the enterprise network 16 and the carrier network 12. When secure tunneling is not employed, additional authentication mechanisms should be employed. In the illustrated embodiment, the mobile terminal 24 may support both cellular and local wireless communications, wherein local wireless communications include Bluetooth, wireless local area network (WLAN), and like communication techniques.

Figure 6A:
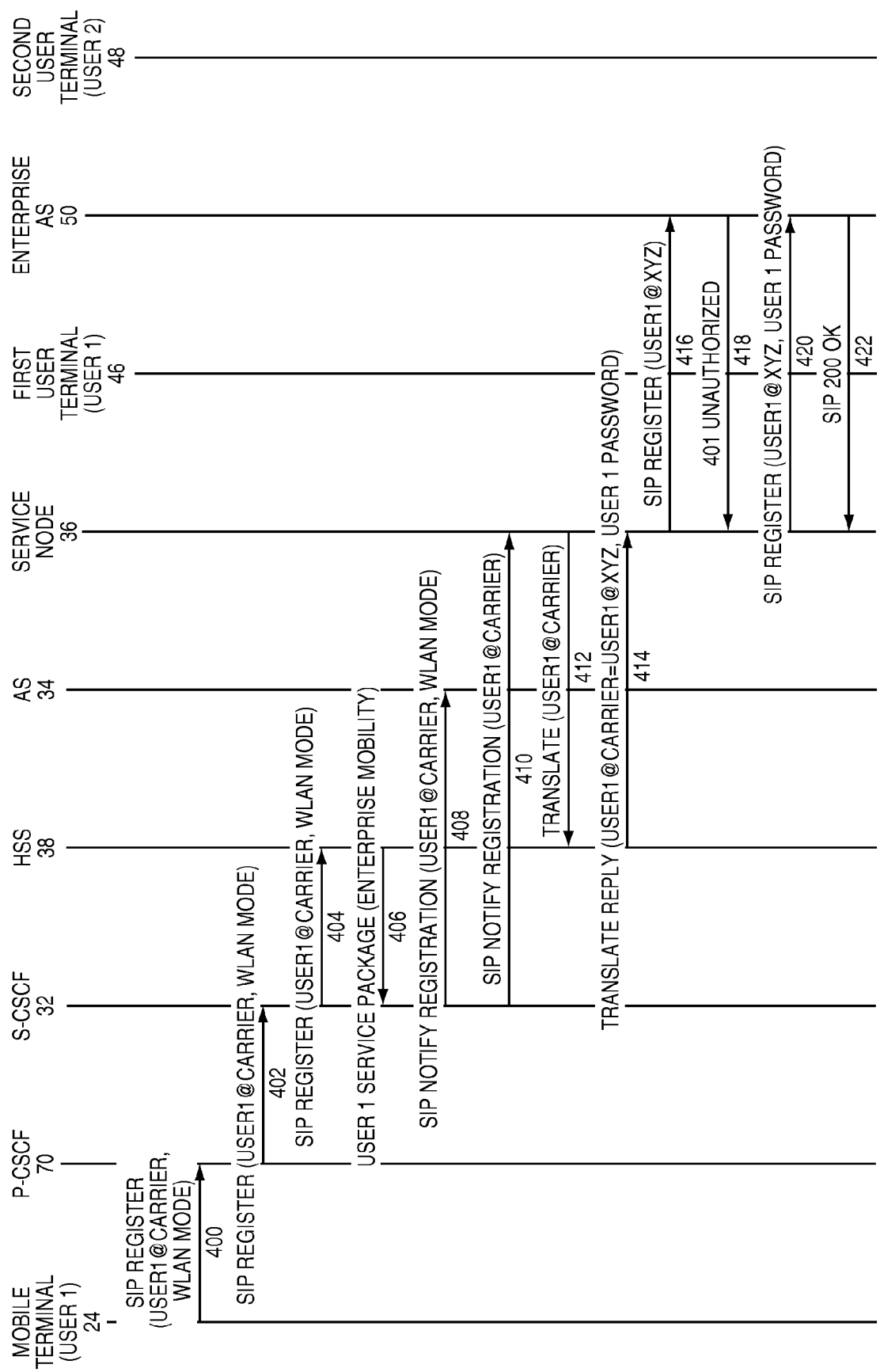
FIGS. 6A-6C are a call flow wherein a mobile terminal registers with an IMS for call services via a WLAN mode, wherein the mobile terminal may also receive services via an enterprise network.
Figure 6B:
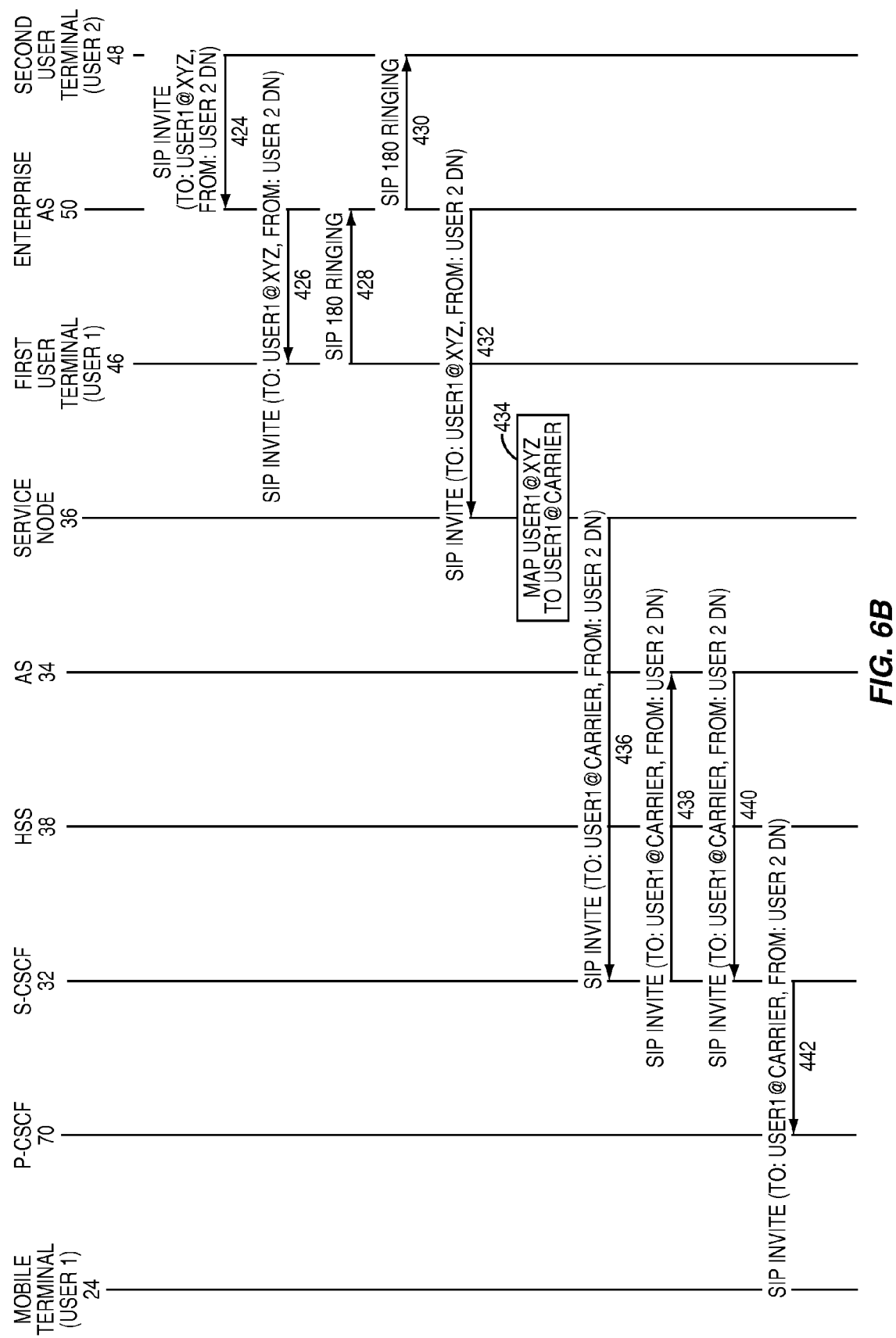
Figure 6C:
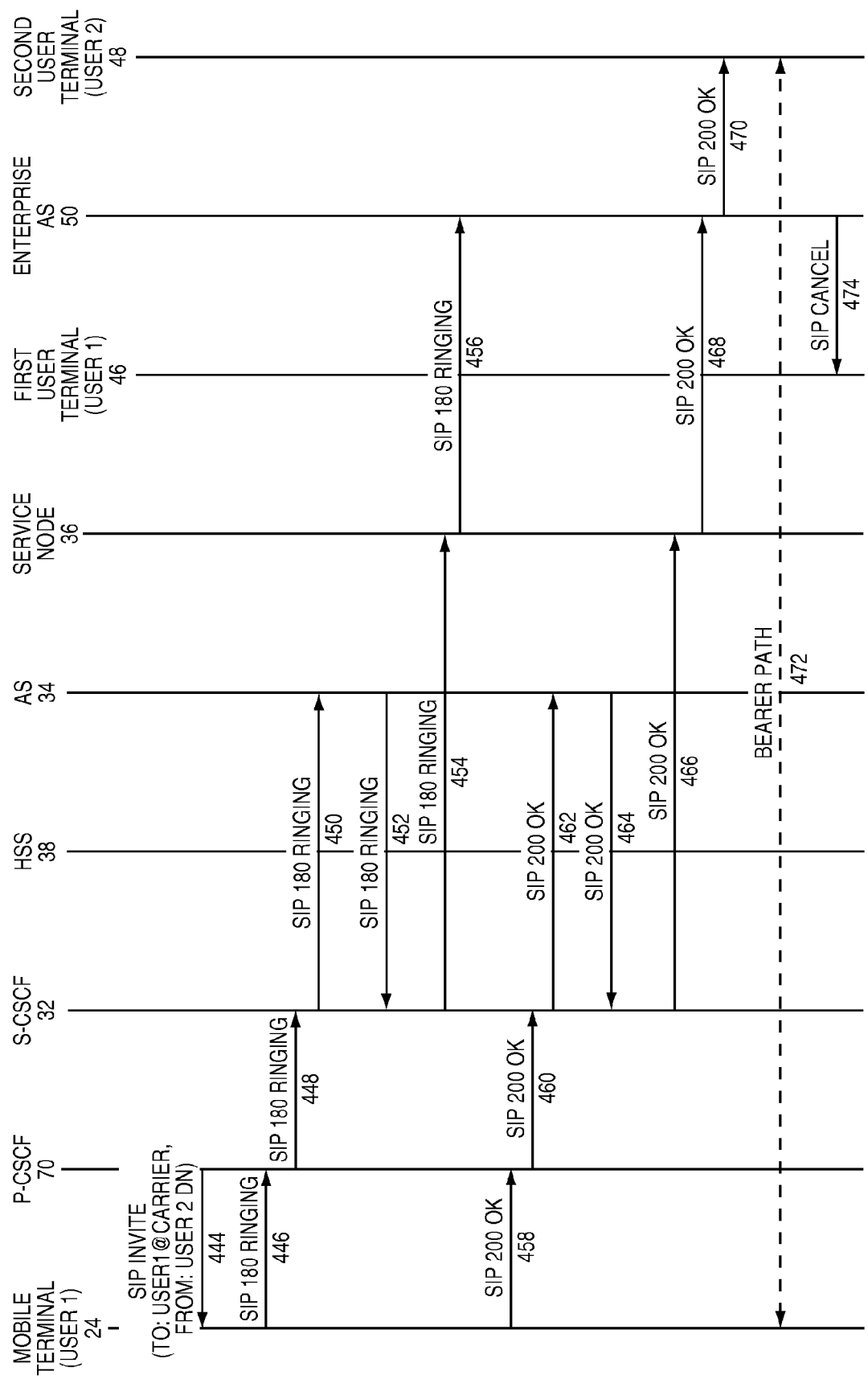

With reference to FIGS. 6A-6C, a communication flow is provided wherein the mobile terminal 24 registers with the IMS 14 in a WLAN mode, which indicates that the mobile terminal 24 may support packet-based local wireless communications via the access point 66. After the mobile terminal 24 is registered, the IMS 14 will register with the enterprise application server 50 via the service node 36. After registration, the second user terminal 48 will initiate a call to the enterprise address for User 1 (USER1@XYZ). Upon receiving the call, the enterprise application server 50 will present the call to the first user terminal 46 as well as to the mobile terminal 24 of User 1. The first one of the first user terminal 46 and the mobile terminal 24 to answer the call is the terminal to which the call will be established.

When the mobile terminal 24 comes within local wireless communication range of the access point 66, a SIP Register message is sent to the P-CSCF 70 to effect registration of the mobile terminal 24 with the IMS 14 (step 400). The SIP Register message will provide the carrier identifier for User 1 associated with the mobile terminal 24 (USER1@CARRIER), as well as indicate that the mobile terminal 24 is operating in a WLAN mode, where local wireless communications are afforded. Upon receipt of the SIP Register message, the P-CSCF 70 will forward the SIP Register message to the S-CSCF 32 (step 402), which will forward the SIP Register message to the HSS 38 (step 404). The HSS 38 will register the mobile terminal 24 of User 1, and indicate that the mobile terminal 24 is operating in WLAN mode. The HSS 38 may access rules associated with User 1, and inform the S-CSCF 32 that User 1 has subscribed to an enterprise mobility package, which allows the mobile terminal 24 to gain access to the enterprise network 16 (step 406).

In this instance, the application server 34 is pulled into the call signaling path to provide any number of IMS services, such as call control and call anchoring. Some of these services are described in further detail in commonly owned and assigned U.S. patent application Ser. No. 11/378,776 filed Mar. 17, 2006, the disclosure of which is incorporated herein by reference in its entirety. This application defines an effective technique for allowing the mobile terminal 24 to transition from one network to another while the remote call leg is anchored at the application server 34. To invoke the services of the application server 34, the S-CSCF 32 may send a SIP Notify Registration message to the application server 34 to subscribe to the services provided by the application server 34 (step 408).

Since the enterprise mobility functionality is being employed by User 1, the S-CSCF 32 will recognize that services provided on behalf of the service node 36 must also be accessed. As such, the S-CSCF 32 will send a SIP Notify Registration message to the service node 36 to subscribe to the services represented by the service node 36, but provided by the enterprise application server 50 (step 410). The SIP Notify Registration message will identify the carrier identifier for User 1, and the service node 36 will access the HSS 38 to identify the enterprise identifier for User 1 (USER1@XYZ) (steps 412 and 414). Notably, the unsecured nature of the network access provided in this example may require special authentication or authorization mechanisms to allow the service node 36 to register User 1 with the enterprise application server 50. In this example, the HSS 38 maintains or has access to password or other authentication indicia, and may provide it to the service node 36 in response to the HSS query (of step 412).

The service node 36 will then attempt to register User 1 with the enterprise application server 50 using the enterprise identifier for User 1, by sending a SIP Register message to the enterprise application server 50 (step 416). In traditional SIP fashion, the initial SIP Register message is provided without a password or other authentication indicia. If authentication is required, the enterprise application server 50 will bounce the registration back by sending a SIP 401 Unauthorized message to the service node 36 (step 418). The service node 36 will respond by resending the SIP Registration message with the password or other authentication indicia to the enterprise application server 50 (step 420). The enterprise application server 50 will process the authentication indicia, and if authorized, will send a SIP 200 OK message back to the service node 36 (step 422). At this point, the registration process is complete and User 1 via mobile terminal 24 is effectively registered with the IMS 14 of the carrier network 12, as well as with the enterprise application server 50 of the enterprise network 16 via the service node 36.

Next assume that User 2 initiates a call from the second user terminal 48 using the enterprise address associated with User 1. To initiate the call, the second user terminal 48 will send a SIP Invite message to the enterprise application server 50 to initiate a session to the enterprise address of User 1 from the directory number associated with User 2 (step 424). The enterprise application server 50 may employ a rule to present the call to all registered terminals of User 1. Assuming that the first user terminal 46 is registered with the enterprise application server 50, along with the mobile terminal 24 that was just registered, the enterprise application server 50 will present the call to both the first user terminal 46 and the mobile terminal 24.

The call is presented to the first user terminal 46 by forwarding the SIP Invite message to the first user terminal 46 (step 426), which will begin alerting User 1 that there is an incoming call, as well as send a SIP 180 Ringing message back to the enterprise application server 50 (step 428). The SIP 180 Ringing message is forwarded to the second user terminal 48 to indicate to User 2 that the call is being presented to User 1 (step 430).

To present the call to the mobile terminal 24, the enterprise application server 50 will forward the SIP Invite message to the service node 36 (step 432). The service node 36 will map the enterprise identifier for User 1 to the carrier identifier for User 1 (step 434), provide any protocol translation, and send a SIP Invite message to the S-CSCF 32 (step 436). The SIP Invite message will use the carrier identifier for User 1 instead of the enterprise identifier for User 1. Since the application server 34 was invoked to remain in the call signaling path, the S-CSCF 32 will route the SIP Invite message through the application server 34, which may or may not operate on the SIP Invite message to provide a desired service. As such, the S-CSCF 32 will forward the SIP Invite message to the application server 34, (step 438), which may or may not process the SIP Invite message, and then forward the resulting SIP Invite message back to the S-CSCF 32 (step 440). The S-CSCF 32 will then forward the SIP Invite message to the P-CSCF 70 (step 442), which will in turn forward the SIP Invite message to the mobile terminal 24 via the access point 66 (step 444).

Upon receipt of the SIP Invite message, the mobile terminal 24 will begin alerting User 1 that there is an incoming call, as well as send a SIP 180 Ringing message back to the P-CSCF 70 (step 446). The P-CSCF 70 will forward the SIP 180 Ringing message to the S-CSCF 32 (step 448), which will forward the SIP 180 Ringing message through the application server 34 (steps 450 and 452) before further forwarding the SIP 180 Ringing message to the service node 36 (step 454). The service node 36 will provide the carrier identifier-to-enterprise identifier translation along with any necessary protocol translation, and forward the SIP 180 Ringing message to the enterprise application server 50 (step 456). Since the second user terminal 48 is already aware that a call is being presented to User 1, the SIP 180 Ringing message is not forwarded to the second user terminal 48.

Assuming that User 1 answers the call at the mobile terminal 24, a SIP 200 OK message is sent by the mobile terminal 24 to the P-CSCF 70 (step 458). The P-CSCF 70 will forward the SIP 200 OK message to the S-CSCF 32 (step 460), which will forward the SIP 200 OK message through the application server 34 (steps 462 and 464) before further forwarding the SIP 200 OK message to the service node 36 (step 466). Again, the service node 36 will provide the appropriate carrier identifier-to-network identifier and protocol translations before forwarding the SIP 200 OK message to the enterprise application server 50 (step 468). The enterprise application server 50 will then forward the SIP 200 OK message to the second user terminal 48 (step 470) to indicate that the call has been answered by the mobile terminal 24. The respective SIP Invite and SIP 200 OK messages may be used to carry the necessary SDP information to allow the second user terminal 48 and mobile terminal 24 to exchange communication capabilities and allow a VoIP-based bearer path to be established therebetween (step 472). Once the call is answered by the mobile terminal 24, the enterprise application server 50 may send a SIP Cancel message to the first user terminal 46 to end call presentation to the first user terminal 46 (step 474).

In this embodiment, the mobile terminal 24 goes through the IMS 14 to access the enterprise network 16. By doing so, the application server 34 may be used to anchor call signaling to the second user terminal 48 to facilitate subsequent movement of the mobile terminal 24 to the CS 20 or PS 22 without disrupting the call. The application server 34 may anchor the call as described in the above-referenced application. Other services may be provided by the application server 34 in addition to call processing and anchoring. Another call example may involve User 1 using a fixed terminal 24' connected to the IMS network via a packet network. In this scenario the service node 36 performs the same carrier identifier-to-enterprise identifier translation along with any necessary protocol translation, as in the previous example.

Figure 7:
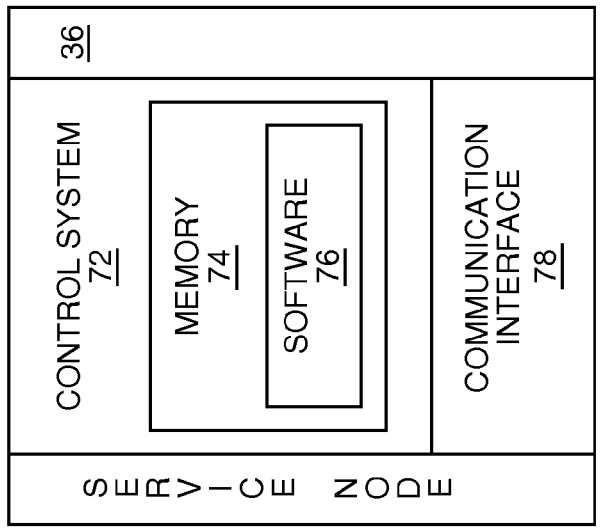
FIG. 7 is a block representation of a service node according to one embodiment of the present invention.

With reference to FIG. 7, a service node 36 is illustrated according to one embodiment of the present invention. The service node 36 will include a control system 72 having sufficient memory 74 for the requisite software 76 to operate as described above. The control system 72 is also associated with a communication interface 78 to facilitate communications directly or indirectly with other nodes in the communication environment 10.

Figure 8:
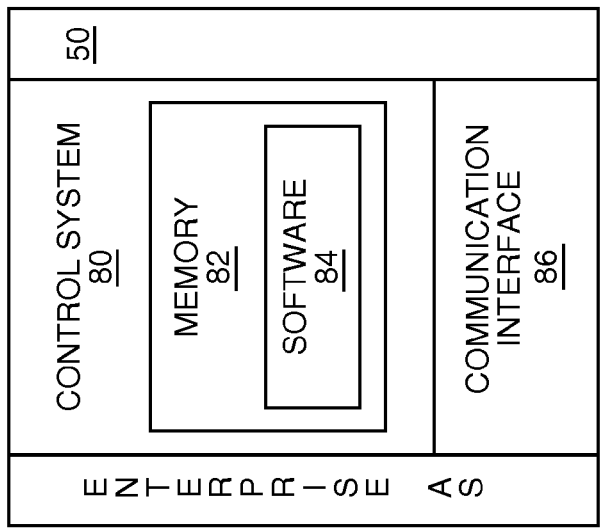
FIG. 8 is a block representation of a enterprise application server according to one embodiment of the present invention.

With reference to FIG. 8, an enterprise application server 50 is illustrated according to one embodiment of the present invention. The enterprise application server 50 will include a control system 80 having sufficient memory 82 for the requisite software 84 to operate as described above. The control system 80 is also associated with a communication interface 86 to facilitate communications directly or indirectly with other nodes in the communication environment 10.

Figure 9:
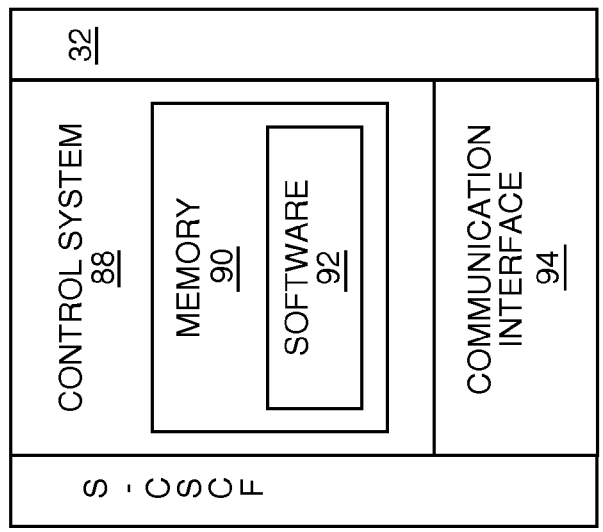
FIG. 9 is a block representation of a serving call/session control function (S-CSCF) according to one embodiment of the present invention.

With reference to FIG. 9, an S-CSCF 32 is illustrated according to one embodiment of the present invention. The S-CSCF 32 will include a control system 88 having sufficient memory 90 for the requisite software 92 to operate as described above. The control system 88 is also associated with a communication interface 94 to facilitate communications directly or indirectly with other nodes in the communication environment 10.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving a first carrier session message from a multimedia subsystem associated with a carrier network and comprising a carrier user identifier identifying a user associated with a communication session;
   identifying an enterprise user identifier corresponding to the carrier user identifier for the first carrier session message, wherein the enterprise user identifier is different from the carrier user identifier and at least one of the enterprise user identifier and the carrier user identifier includes a session initiation protocol (SIP) identifier;

creating a first enterprise session message corresponding to the first carrier session message and comprising the enterprise user identifier; and forwarding the first enterprise session message into an enterprise network, wherein the first enterprise session message is an initial message transmitted into the enterprise network associated with the first carrier session message.

2. The method claim 1 wherein the first enterprise session message is forwarded toward an enterprise application server to invoke an originating enterprise application service provided by the enterprise application server for the communication session on behalf of the user establishing the session.

3. The method of claim 2 further comprising:
receiving from the enterprise application server a second enterprise session message associated with the communication session and comprising the enterprise user identifier, the second enterprise session message responsive to providing the enterprise application service to the first enterprise session message;
identifying the carrier user identifier corresponding to the enterprise user identifier for the second enterprise session message;
creating a second carrier session message corresponding to the second enterprise session message and comprising the carrier user identifier; and
forwarding the second carrier session message into the multimedia subsystem.

4. The method of claim 1 further comprising:
receiving from the enterprise network a second enterprise session message associated with the communication session and comprising the enterprise user identifier;
identifying the carrier user identifier corresponding to the enterprise user identifier for the second enterprise session message;
creating a second carrier session message corresponding to the second enterprise session message and comprising the carrier user identifier; and
forwarding the second carrier session message into the multimedia subsystem.

5. The method of claim 1 wherein the enterprise user identifier is used to identify the terminal within the enterprise network, and the carrier user identifier is used to identify the terminal within the carrier network.

6. The method of claim 1 wherein the enterprise user identifier is not a valid user identifier in the carrier network.

7. The method of claim 1 wherein control of the communication session is provided by the multimedia subsystem.

8. The method of claim 1 wherein the multimedia subsystem is an Internet Protocol Multimedia Subsystem of the carrier network.

9. The method of claim 1 further comprising effecting establishment of at least a portion of a bearer path for the communication session outside of the enterprise network and via a circuit-switched subsystem of the carrier network.

10. The method of claim 1 further comprising:
receiving from the multimedia subsystem a first registration message comprising the carrier user identifier for the user;
identifying the enterprise user identifier corresponding to the carrier user identifier for the first registration message;
creating a second registration message corresponding to the first registration message and comprising the enterprise user identifier; and
forwarding the second registration message into the enterprise network to register the user with the enterprise network.

11. The method of claim 1 wherein the first carrier session message and the first enterprise session message are session control messages facilitating at least one of the group consisting of establishment of the communication session and controlling the communication session once the communication session is established.

12. A system comprising:
at least one communication interface; and
a control system associated with the at least one communication interface and configured to:
receive a first carrier session message from a multimedia subsystem associated with a carrier network and comprising a carrier user identifier identifying a user associated with a communication session;
identify an enterprise user identifier corresponding to the carrier user identifier for the first carrier session message, wherein the enterprise user identifier is different from the carrier user identifier and at least one of the enterprise user identifier and the carrier user identifier includes a session initiation protocol (SIP) identifier;
create a first enterprise session message corresponding to the first carrier session message and comprising the enterprise user identifier; and
forward the first enterprise session message into an enterprise network, wherein the first enterprise session message is an initial message transmitted into the enterprise network associated with the first carrier session message.

13. The system claim 12 wherein the first enterprise session message is forwarded toward an enterprise application server to invoke an originating enterprise application service provided by the enterprise application server for the communication session on behalf of the user establishing the session.

14. The system of claim 13 wherein the control system is further configured to:
receive from the enterprise application server a second enterprise session message associated with the communication session and comprising the enterprise user identifier, the second enterprise session message responsive to providing the enterprise application service to the first enterprise session message;
identify the carrier user identifier corresponding to the enterprise user identifier for the second enterprise session message;
create a second carrier session message corresponding to the second enterprise session message and comprising the carrier user identifier; and
forward the second carrier session message into the multimedia subsystem.

15. The system of claim 12 wherein the control system is further configured to:
receive from the enterprise network a second enterprise session message associated with the communication session and comprising the enterprise user identifier;
identify the carrier network address corresponding to the enterprise user identifier for the second enterprise session message;
create a second carrier session message corresponding to the second enterprise session message and comprising the carrier user identifier; and
forward the second carrier session message into the multimedia subsystem.

16. The system of claim 12 wherein the enterprise user identifier is used to identify the terminal within the enterprise network, and the carrier user identifier is used to identify the terminal within the carrier network.

17. The system of claim 12 wherein the enterprise user identifier is not a valid user identifier in the carrier network.

18. The system of claim 12 wherein control of the communication session is provided by the multimedia subsystem.

19. The system of claim 12 wherein the multimedia subsystem is an Internet Protocol Multimedia Subsystem of the carrier network.

20. The system of claim 12 wherein the control system is further configured to effect establishment of at least a portion of a bearer path for the communication session outside of the enterprise network and via a circuit-switched subsystem of the carrier network.

21. The system of claim 12 wherein the control system is further configured to:
- receive from the multimedia subsystem a first registration message comprising the carrier user identifier for the user;
- identify the enterprise user identifier corresponding to the carrier user identifier for the first registration message;
- create a second registration message corresponding to the first registration message and comprising the enterprise user identifier; and
- forward the second registration message into the enterprise network to register the user with the enterprise network.

* * * * *